(12) United States Patent
Chen et al.

(10) Patent No.: US 10,405,306 B2
(45) Date of Patent: Sep. 3, 2019

(54) HALF-DUPLEX OPERATION FOR LOW COST WIRELESS DEVICES

(71) Applicants: Wanshi Chen, San Diego, CA (US); Hao Xu, San Diego, CA (US); Juan Montojo, Nuremberg (DE); Peter Gaal, San Diego, CA (US); Jelena M. Damnjanovic, Del Mar, CA (US)

(72) Inventors: Wanshi Chen, San Diego, CA (US); Hao Xu, San Diego, CA (US); Juan Montojo, Nuremberg (DE); Peter Gaal, San Diego, CA (US); Jelena M. Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 13/631,368

(22) Filed: Sep. 28, 2012

(65) Prior Publication Data
US 2013/0083710 A1    Apr. 4, 2013

Related U.S. Application Data

(60) Provisional application No. 61/540,939, filed on Sep. 29, 2011.

(51) Int. Cl.
*H04W 72/04* (2009.01)
*H04L 5/16* (2006.01)

(52) U.S. Cl.
CPC ............. *H04W 72/042* (2013.01); *H04L 5/16* (2013.01); *H04W 72/0446* (2013.01)

(58) Field of Classification Search
CPC .......... H04W 72/042; H04W 72/0446; H04W 72/048; H04W 72/1205; H04W 72/1289; H04L 5/16
See application file for complete search history.

(56) References Cited

U.S. PATENT DOCUMENTS

| 7,986,681 B2 * | 7/2011 | Astely ............... H04B 7/2656 370/252 |
| 9,420,601 B2 * | 8/2016 | Abrahamsson ... H04W 72/1231 |
| 9,560,648 B2 * | 1/2017 | Tirkkonen ........ H04W 72/0446 |

(Continued)

FOREIGN PATENT DOCUMENTS

| EP | 1821429 A2 | 8/2007 |
| WO | 2008127183 A2 | 10/2008 |

(Continued)

OTHER PUBLICATIONS

Ericsson: "Impacts of Half-Duplex FDD UE Operation on RAN2 Specifications", 3GPP Draft; R2-082150, 3rd Generation , Partnership Project (3GPP), Mobile Competence Centre; 650, Route Des Lucioles ; F-06921 Sophia-Antipolis Cedex; France, vol. RAN WG2, no. Kansas City, USA; Apr. 28, 2008, Apr. 28, 2008 (Apr. 28, 2008), XP058139929.

(Continued)

*Primary Examiner* — Habte Mered
(74) *Attorney, Agent, or Firm* — Patterson & Sheridan, LLP

(57) ABSTRACT

Certain aspects of the present disclosure provide techniques for enabling half-duplex (HD) operations between one or more user equipments (UEs) and one or more base stations.

27 Claims, 11 Drawing Sheets

(56) References Cited

U.S. PATENT DOCUMENTS

| | | | |
|---|---|---|---|
| 2007/0041347 A1* | 2/2007 | Beale | H04W 48/10 370/335 |
| 2008/0212501 A1* | 9/2008 | Harrang | H04W 72/1263 370/281 |
| 2009/0046672 A1 | 2/2009 | Malladi et al. | |
| 2009/0073902 A1* | 3/2009 | Astely et al. | 370/280 |
| 2009/0135748 A1* | 5/2009 | Lindoff et al. | 370/296 |
| 2009/0147867 A1* | 6/2009 | Okamoto et al. | 375/260 |
| 2009/0180402 A1* | 7/2009 | Lindoff | H04B 1/44 370/277 |
| 2009/0296609 A1* | 12/2009 | Choi | H04W 72/121 370/281 |
| 2010/0027473 A1* | 2/2010 | Ghosh | H04L 27/2613 370/328 |
| 2010/0061322 A1* | 3/2010 | Kim et al. | 370/329 |
| 2010/0085901 A1* | 4/2010 | Womack | H04B 7/2656 370/278 |
| 2010/0135235 A1* | 6/2010 | Ji | H04W 72/082 370/329 |
| 2010/0322115 A1* | 12/2010 | Wei | H04L 25/0224 370/280 |
| 2011/0038302 A1* | 2/2011 | Papasakellariou | H04L 5/0007 370/315 |
| 2011/0176461 A1* | 7/2011 | Astely | H04B 7/2656 370/280 |
| 2012/0020256 A1 | 1/2012 | Tujkovic et al. | |
| 2012/0093082 A1* | 4/2012 | Kim | H04L 5/001 370/328 |
| 2012/0182908 A1* | 7/2012 | Pan | H04W 28/18 370/280 |
| 2012/0207038 A1* | 8/2012 | Choi | H04W 16/14 370/252 |
| 2013/0077551 A1* | 3/2013 | Lo | H04W 16/14 370/312 |
| 2014/0219144 A1* | 8/2014 | Najatian | H04B 7/2643 370/280 |
| 2014/0342738 A1* | 11/2014 | Ishii | H04W 28/08 455/436 |
| 2014/0355495 A1* | 12/2014 | Nejatian | H04B 1/0483 370/280 |

FOREIGN PATENT DOCUMENTS

| | | |
|---|---|---|
| WO | 2009042158 A2 | 4/2009 |
| WO | 2009063001 A2 | 5/2009 |
| WO | 2009088344 A2 | 7/2009 |
| WO | 2010147415 A2 | 12/2010 |

OTHER PUBLICATIONS

International Search Report and Written Opinion—PCT/US2012/058158—ISA/EPO—dated Feb. 6, 2013.

* cited by examiner

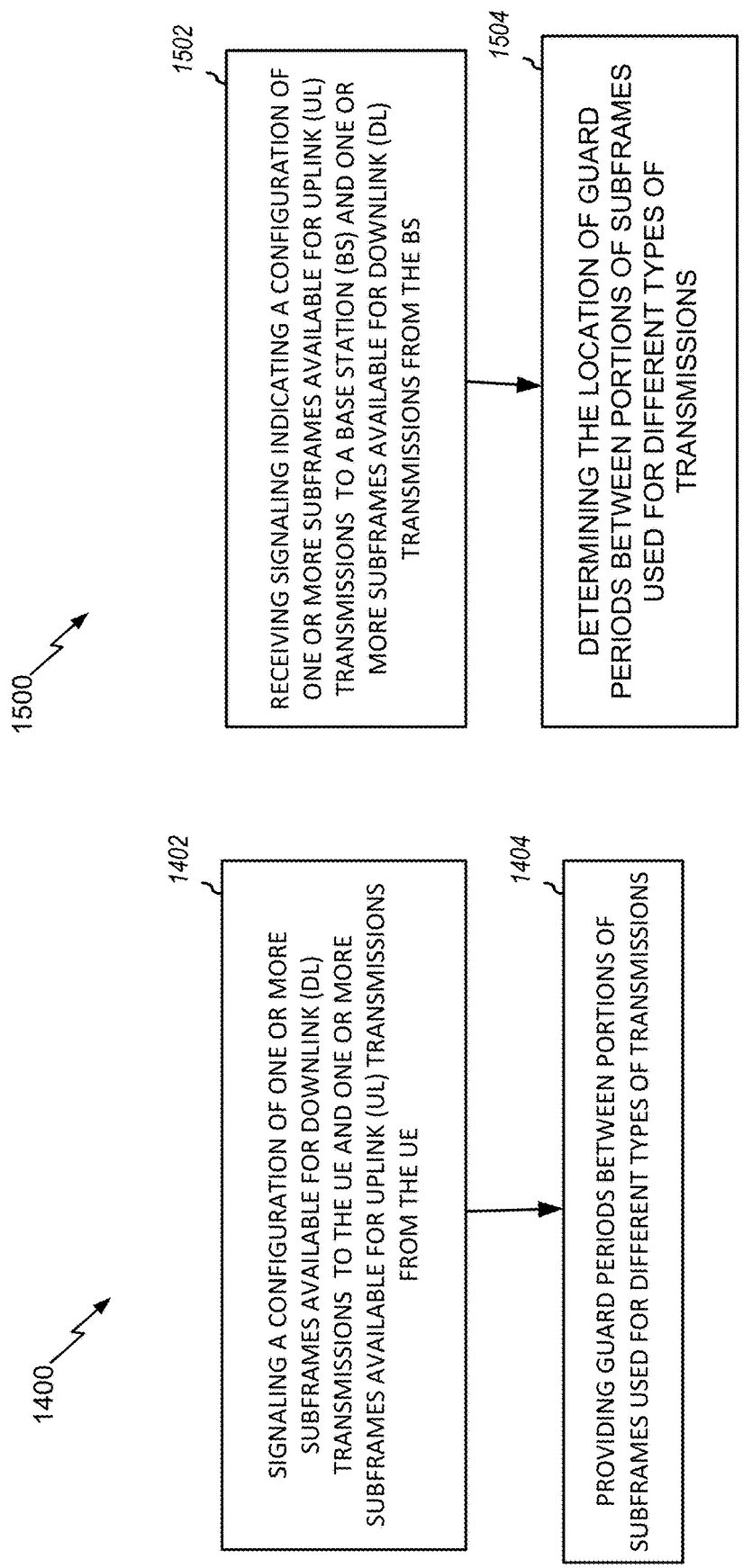

HALF-DUPLEX OPERATION FOR LOW COST WIRELESS DEVICES

CLAIM OF PRIORITY UNDER 35 U.S.C. § 119

The present Application for Patent claims priority to U.S. Provisional Application No. 61/540,939, entitled HALF-DUPLEX OPERATION FOR LOW COST WIRELESS DEVICES, filed Sep. 29, 2011, and assigned to the assignee hereof and hereby expressly incorporated by reference herein.

TECHNICAL FIELD

Certain aspects of the present disclosure generally relate to wireless communications and, more particularly, to methods for enabling half-duplex operation.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

In some cases, half-duplex (HD) operations may be utilized, in which only of the terminal and base station may transmit at any time. HD operations may help reduce the cost of terminals, for example, by eliminating the need for a duplexer. However, various challenges are presented when operating a UE in HD mode.

SUMMARY

Certain aspects of the present disclosure provide a method for enabling half-duplex (HD) operations for at least one user equipment (UE). The method generally includes determining, from a configuration of available uplink (UL) and downlink (DL) subframes for a given periodicity, a constrained configuration representing a reduced set of the available UL and DL subframes for use by a UE for half duplex (HD) communication with a base station and signaling the constrained configuration to the UE. In some cases, the periodicity may be determined, at least in part, based on considerations related to neighbor cell search if different subframe offsets are used among cells Certain aspects of the present disclosure provide a method for enabling half-duplex (HD) operations for at least one user equipment (UE). The method generally includes signaling a configuration of one or more subframes available for downlink (DL) transmissions to a UE and one or more subframes available for uplink (UL) transmissions from the UE and providing guard periods between portions of subframes used for different types of transmissions.

Certain aspects of the present disclosure provide a method for enabling half-duplex (HD) operations by a user equipment (UE). The method generally includes receiving signaling indicating a constrained configuration representing a reduced set of one or more DL subframes and one or more UL subframes for use by the UE for half duplex (HD) communication with a base station, the reduced set selected from a configuration of uplink (UL) and downlink (DL) subframes for a given periodicity and performing HD communications with the base station based on the configuration.

Certain aspects of the present disclosure provide a method for enabling half-duplex (HD) operations by a user equipment (UE). The method generally includes receiving signaling indicating a configuration of one or more subframes available for uplink (UL) transmissions to a base station (BS) and one or more subframes available for downlink (DL) transmissions from the BS and determining the location of guard periods between portions of subframes used for different types of transmissions.

Certain aspects of the present disclosure provide an apparatus for enabling half-duplex (HD) operations for at least one user equipment (UE). The apparatus generally includes means for determining, from a configuration of available uplink (UL) and downlink (DL) subframes for a given periodicity, a constrained configuration representing a reduced set of the available UL and DL subframes for use by a UE for half duplex (HD) communication with a base station and means for signaling the constrained configuration to the UE.

Certain aspects of the present disclosure provide an apparatus for enabling half-duplex (HD) operations for at least one user equipment (UE). The apparatus generally includes means for signaling a configuration of one or more subframes available for downlink (DL) transmissions to a UE and one or more subframes available for uplink (UL) transmissions from the UE and means for providing guard periods between portions of subframes used for different types of transmissions.

Certain aspects of the present disclosure provide an apparatus for enabling half-duplex (HD) operations by a user equipment (UE). The apparatus generally includes means for receiving signaling indicating a constrained configuration representing a reduced set of one or more DL subframes and one or more UL subframes for use by the UE for half duplex (HD) communication with a base station, the reduced set selected from a configuration of uplink (UL) and downlink (DL) subframes for a given periodicity and means for performing HD communications with the base station based on the configuration.

Certain aspects of the present disclosure provide an apparatus for enabling half-duplex (HD) operations by a user equipment (UE). The apparatus generally includes means for receiving signaling indicating a configuration of one or more subframes available for uplink (UL) transmissions to a base station (BS) and one or more subframes available for downlink (DL) transmissions from the BS and means for determining the location of guard periods between portions of subframes used for different types of transmissions.

Certain aspects of the present disclosure provide an apparatus for enabling half-duplex (HD) operations for at least one user equipment (UE). The apparatus generally includes at least one processor configured to determine, from a configuration of available uplink (UL) and downlink (DL) subframes for a given periodicity, a constrained configuration representing a reduced set of the available UL and DL subframes for use by a UE for half duplex (HD) communication with a base station and signal the constrained configuration to the UE; and a memory coupled with the at least one processor.

Certain aspects of the present disclosure provide an apparatus for enabling half-duplex (HD) operations for at least one user equipment (UE). The apparatus generally includes at least one processor configured to signal a configuration of one or more subframes available for downlink (DL) transmissions to a UE and one or more subframes available for uplink (UL) transmissions from the UE and provide guard periods between portions of subframes used for different types of transmissions; and a memory coupled with the at least one processor.

Certain aspects of the present disclosure provide an apparatus for enabling half-duplex (HD) operations by a user equipment (UE). The apparatus generally includes at least one processor configured to receive signaling indicating a constrained configuration representing a reduced set of one or more DL subframes and one or more UL subframes for use by the UE for half duplex (HD) communication with a base station, the reduced set selected from a configuration of uplink (UL) and downlink (DL) subframes for a given periodicity and perform HD communications with the base station based on the configuration; and a memory coupled with the at least one processor.

Certain aspects of the present disclosure provide an apparatus for enabling half-duplex (HD) operations by a user equipment (UE). The apparatus generally includes at least one processor configured to receive signaling indicating a configuration of one or more subframes available for uplink (UL) transmissions to a base station (BS) and one or more subframes available for downlink (DL) transmissions from the BS and determine the location of guard periods between portions of subframes used for different types of transmissions; and a memory coupled with the at least one processor.

Certain aspects of the present disclosure provide a computer program product for enabling half-duplex (HD) operations for at least one user equipment (UE), comprising a computer readable medium having instructions stored thereon. The instructions are generally executable by one or more processors for determining, from a configuration of available uplink (UL) and downlink (DL) subframes for a given periodicity, a constrained configuration representing a reduced set of the available UL and DL subframes for use by a UE for half duplex (HD) communication with the base station and signaling the constrained configuration to the UE.

Certain aspects of the present disclosure provide a computer program product for enabling half-duplex (HD) operations for at least one user equipment (UE), comprising a computer readable medium having instructions stored thereon. The instructions are generally executable by one or more processors for signaling a configuration of one or more subframes available for downlink (DL) transmissions to a UE and one or more subframes available for uplink (UL) transmissions from the UE and providing guard periods between portions of subframes used for different types of transmissions.

Certain aspects of the present disclosure provide a computer program product for enabling half-duplex (HD) operations for at least one user equipment (UE), comprising a computer readable medium having instructions stored thereon. The instructions are generally executable by one or more processors for receiving signaling indicating a constrained configuration representing a reduced set of one or more DL subframes and one or more UL subframes for use by the UE for half duplex (HD) communication with a base station, the reduced set selected from a configuration of uplink (UL) and downlink (DL) subframes for a given periodicity and performing HD communications with the BS based on the configuration.

Certain aspects of the present disclosure provide a computer program product for enabling half-duplex (HD) operations for at least one user equipment (UE), comprising a computer readable medium having instructions stored thereon. The instructions are generally executable by one or more processors for receiving signaling indicating a configuration of one or more subframes available for uplink (UL) transmissions to a base station (BS) and one or more subframes available for downlink (DL) transmissions from the BS and determining the location of guard periods between portions of subframes used for different types of transmissions.

BRIEF DESCRIPTION OF THE DRAWINGS

FIGS. 11 and 12 illustrate example FDD subframe configurations, according to certain aspects of the present disclosure.

FIGS. 14 and 15 illustrate example FDD subframe configurations, according to certain aspects of the present disclosure.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below.

Figure 1:
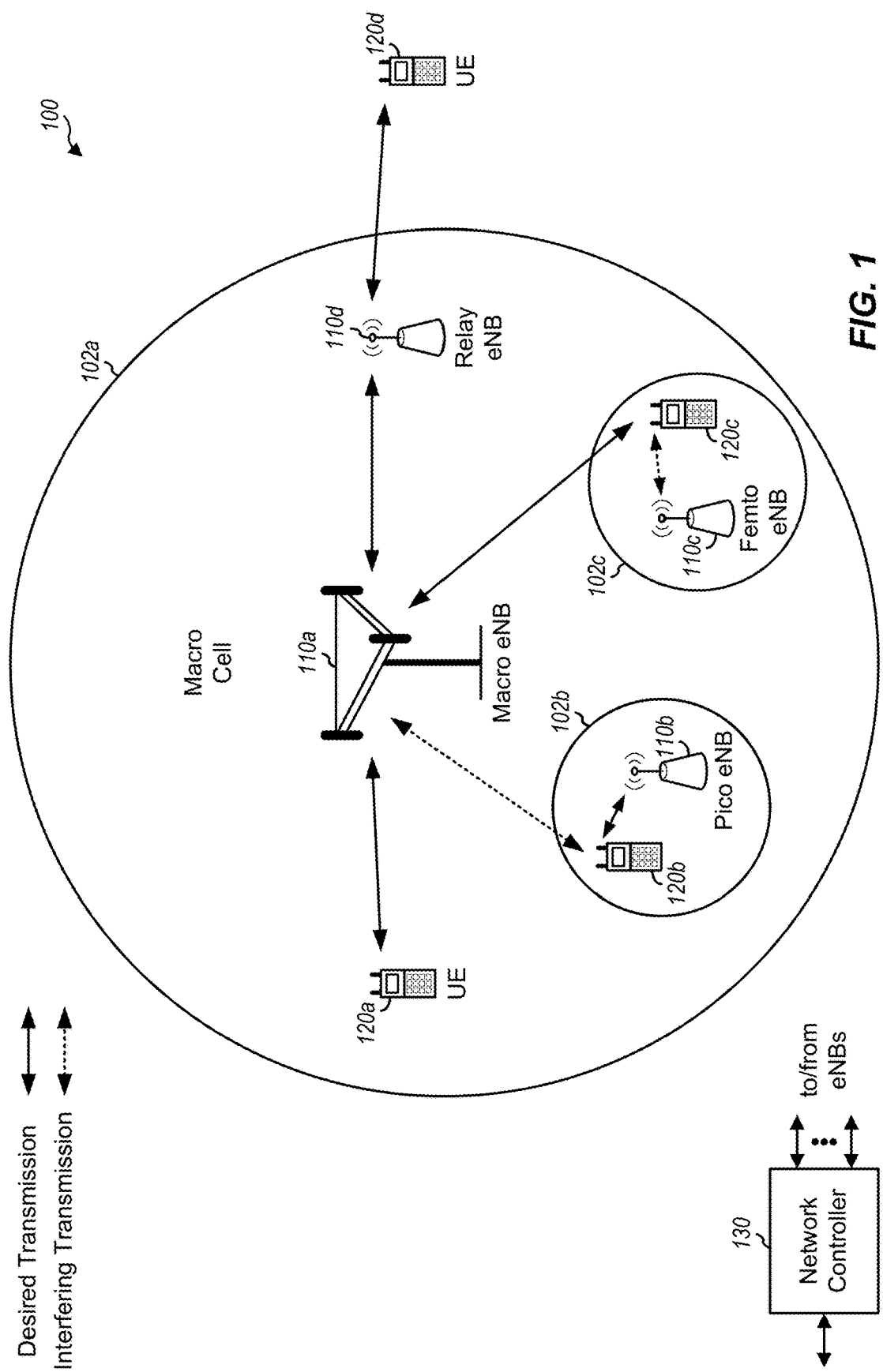
FIG. 1 is a block diagram conceptually illustrating an example of a wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc.

Figure 2:
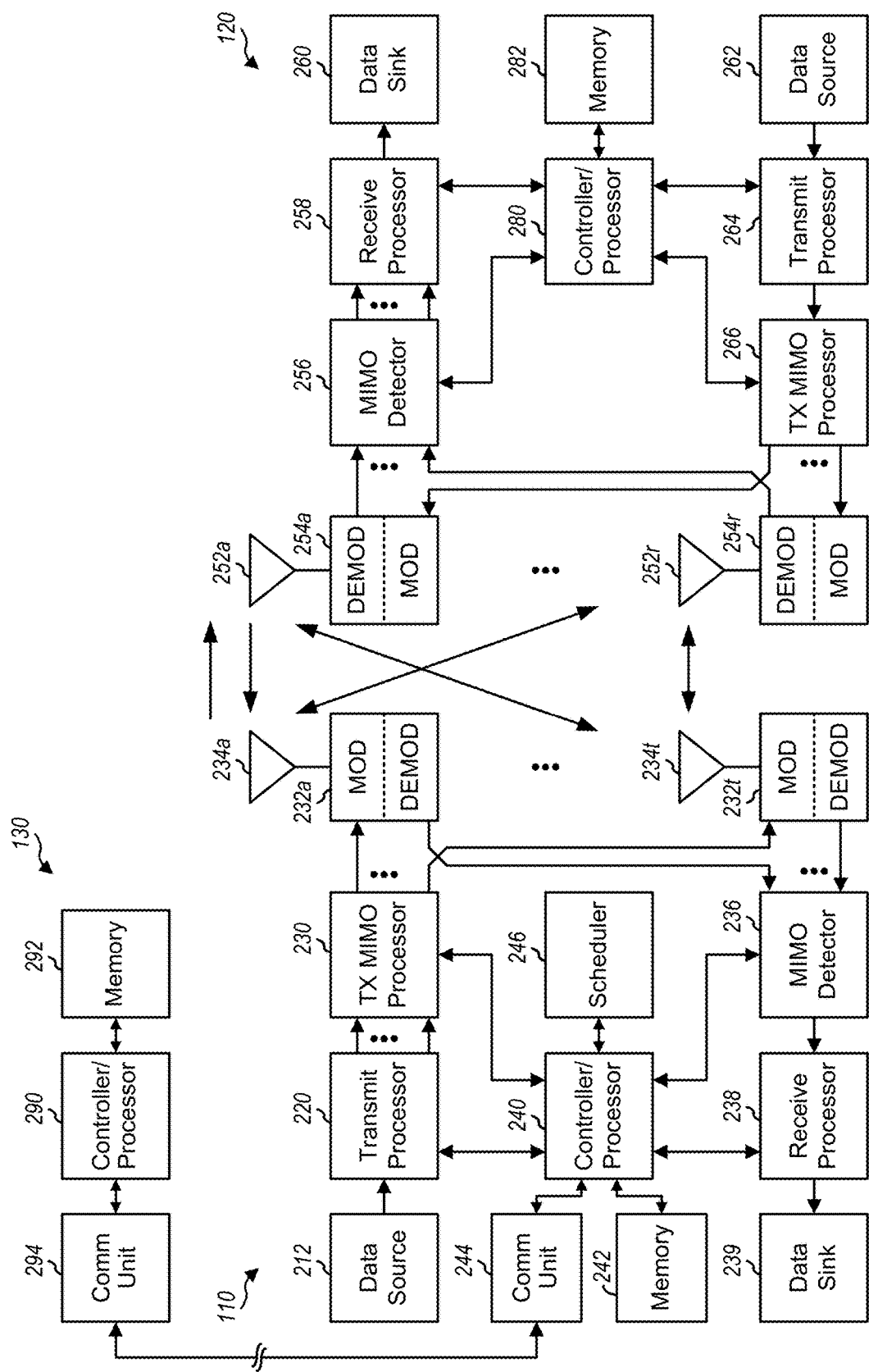
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

As will be described in further detail below, when transmitting data to the UE 120 the base station 110 may be configured to determining a bundling size based at least in part on a data allocation size and precode data in bundled contiguous resource blocks of the determined bundling size, wherein resource blocks in each bundle are precoded with a common precoding matrix. That is, reference signals such as UE-RS and/or data in the resource blocks are precoded using the same precoder. The power level used for the UE-RS in each RB of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous resource blocks (RBs), wherein at least one reference signal in resource blocks in each bundle are precoded with a common precoding matrix, estimate at least one precoded channel based on the determined bundling size and one or more reference signals (RSs) transmitted from the base station, and decode the received bundles using the estimated precoded channel.

Figure 3:
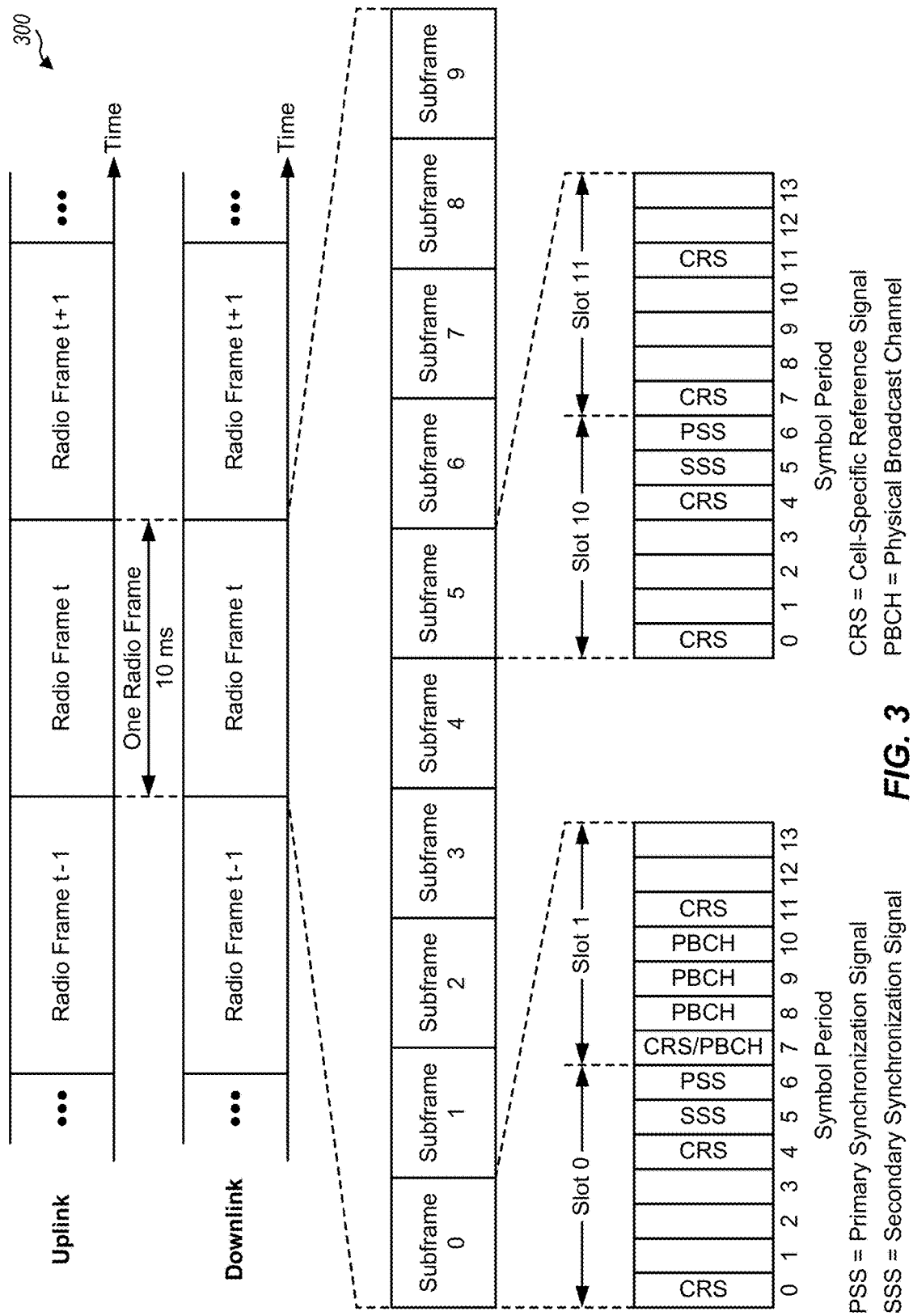
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
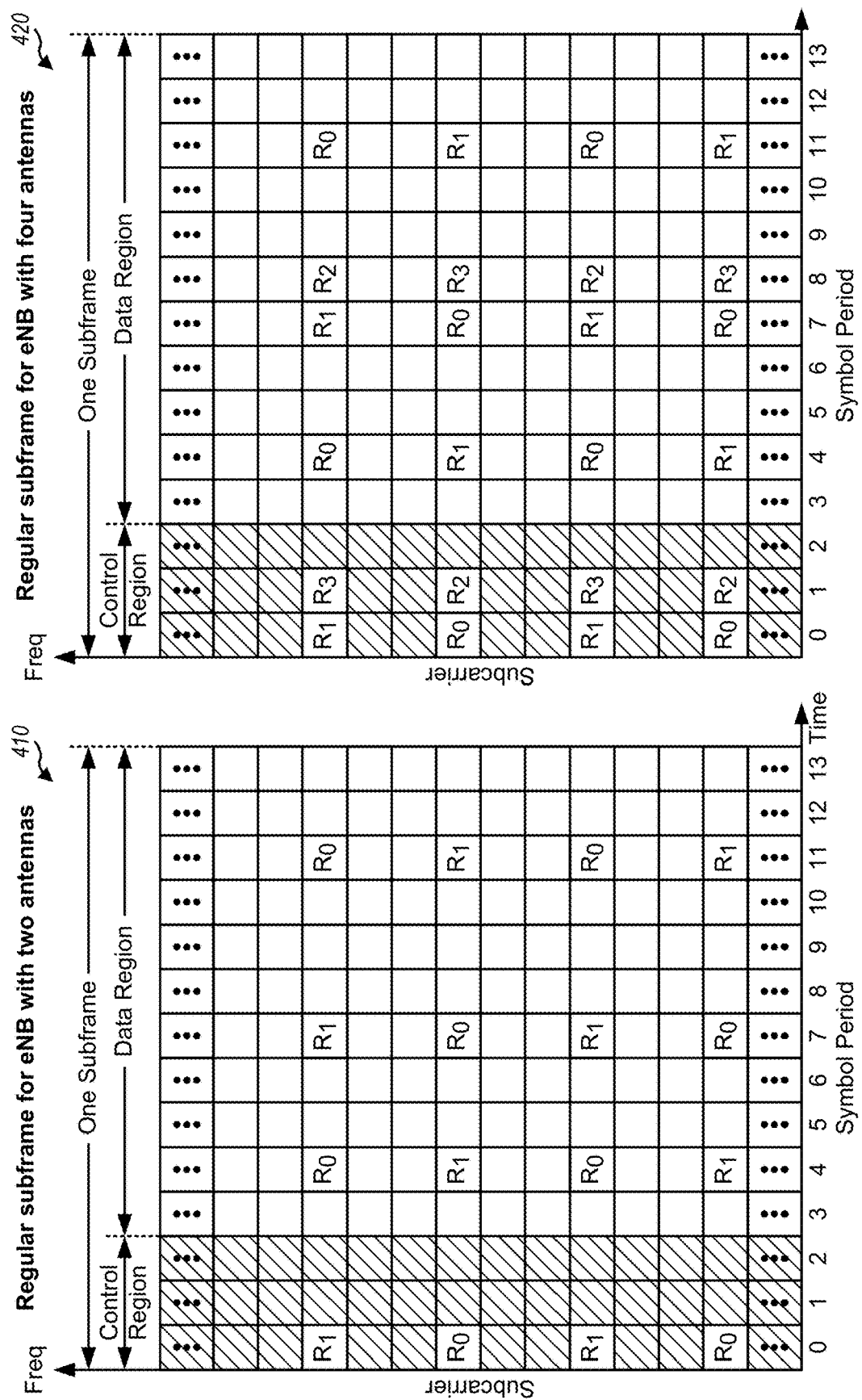
FIG. 4 illustrates two exemplary subframe formats for the downlink, in accordance with certain aspects of the present disclosure.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, Q−1}.

The wireless network may support hybrid automatic repeat request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Half Duplex Operation

LTE Rel-8 supports a frame structure for frequency division duplex (FDD) and a frame structure for time division duplex (TDD). The frame structure for FDD supports full-duplex (FD) and half-duplex (HD) operation modes. While for FD operations there may be no restrictions about when a user equipment (UE) can transmit or receive, for HD operations, the UE may only transmit or receive at a given point in time. HD operations were introduced in Rel-8 of LTE to enable low cost implementations of LTE terminals comparable to those of GSM (e.g., an FDD HD system). The primary cost savings from HD operations stem from the absence of a duplexer. Even though HD operations provide cost-savings at the terminal side, the infrastructure needs to support the operation mode.

For HD FDD operations, a guard period may be created by the UE by not receiving the last part of a downlink subframe immediately preceding an uplink subframe from the same UE. In this manner, for HD operations, the UL transmission timing may be aligned by not receiving the last part of the downlink subframe. For some embodiments, an eNB may use this knowledge to adjust the DL transmission rate whenever the eNB schedules the HD UE for the UL immediately following a DL transmission.

Figure 5:
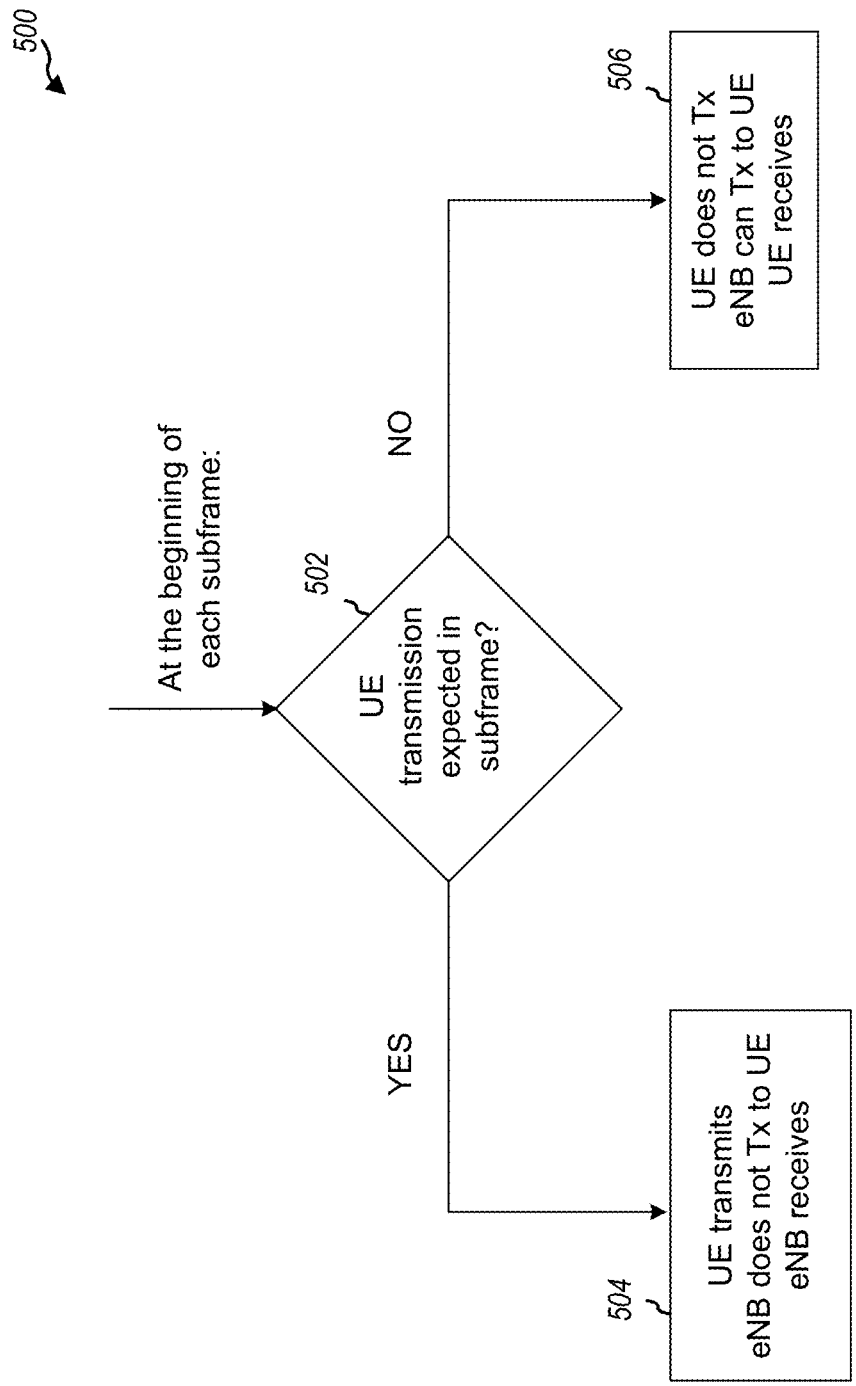
FIG. 5 illustrates an example decision tree for HD operations, according to certain aspects of the present disclosure.

Traditionally, the HD operation in LTE has been regarded as mainly an implementation issue not requiring air-interface specifications. FIG. 5 shows a decision tree for the LTE HD operation.

As can be seen from FIG. 5, LTE HD operation may require that the UE and the eNB continuously check (at 502) the need or expectation for the UE to transmit to know whether the UE will transmit in a given subframe (504) or will be able to receive in a given subframe (at 506). The expectation may come from, e.g., layer 3 configuration of periodic CQI reports. One benefits of this (dynamic) HD operation may be that there is not a fixed structure in the time-domain waveform for HD operation support, and a LTE eNB can support concurrent support of FD and HD devices.

The present disclosure, however, provides design alternatives of half-duplex operation for low cost devices. Some of these alternatives may require changes to air interface specifications. The design alternatives may leverage existing LTE features, for example in FDD eNBs, a TDD UE and a half-duplex relay node, to enable more efficient half-duplex operation while requiring relatively minimal new standard specifications.

Figure 6:
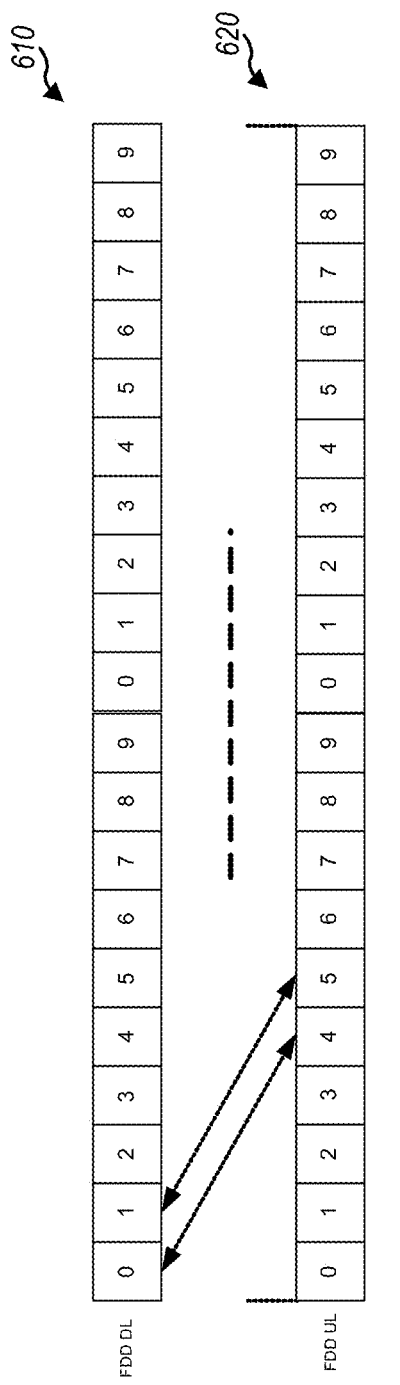
FIG. 6 illustrates an example relationship between downlink transmissions and feedback subframes, according to certain aspects of the present disclosure.

As shown in FIG. 6, in traditional FDD, a pair of different carriers (610 and 620) are utilized for downlink (DL) and uplink (UL) communications, respectively.

DL H-ARQ is asynchronous. However, the timing between a PDSCH transmission and a H-ARQ feedback is typically fixed at 4 ms. UL H-ARQ is synchronous. The round trip time (RTT) is fixed at 8 ms, consisting of a 4 ms delay between a PDCCH/PHICH assigning/triggered a PUSCH transmission and the corresponding PUSCH transmission, and another 4 ms delay between a PUSCH transmission and the next control signaling.

Figure 7:
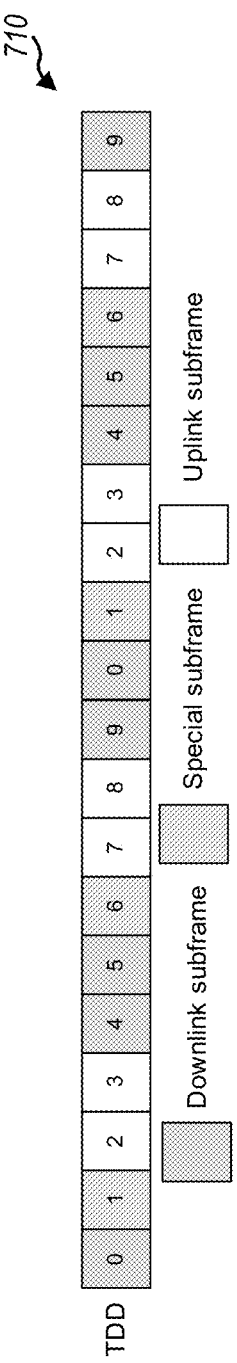
FIG. 7 illustrates an example TDD subframe configuration, according to certain aspects of the present disclosure.

In TDD, downlink and uplink communications happen with distinct subframes, as illustrated below for downlink/link configuration 1 as shown in FIG. 7. While FIG. 7 illustrates just one configuration 710, there may be a total 7 downlink/uplink configurations defined in the LTE specifications, with each representing different tradeoffs between downlink and uplink needs. A UE is signaled the downlink/uplink configuration utilized by the serving eNB.

As will be described in greater detail below, certain aspects of the present disclosure provide for a constrained configuration representing a reduced set of available DL and UL subframes to be allocated for HD communications with a UE.

As discussed above, the particulars of HD operation for a UE in current specifications may be regarded as mainly an implementation issue, not requiring changes to air-interface specifications. Such HD operation according to LTE may be summarized as follows.

At the beginning of every subframe (or at least relatively close to the beginning, considering transition time to switch from receive to transmit or vice-versa), the UE may determine whether or not it has to transmit any channel or signal in the subframe. If the UE has to transmit something, it will use this subframe for transmission purposes. Otherwise, the UE will use this subframe for reception.

It may be noted that the eNB (scheduler) may then know when the UE has to transmit something in a given subframe and, therefore, may be expected to use this information to determine when to schedule UE transmissions and receptions.

As a result, and as previously described with reference to FIG. 5, HD operation may require the UE and the eNB to continuously check the need or expectation for the UE to transmit to know whether the UE will be able to receive in a given subframe. There are various drawbacks associated with this approach. For example, there may be potential misalignment at times between the eNB and UE when the eNB and UE do not agree on what a particular subframe will be used for.

For example, the misalignment may be due to PDCCH mis-detections. In this case, an eNB may transmit a PDCCH in subframe n, expecting UL transmissions from the UE at subframe n+4. The eNB would then not transmit anything on DL at subframe n+4, even though the UE did not actually receive the PDCCH, and would still be monitoring the DL at subframe n+4. While this leads to inefficiencies, it at least does not by itself does not have impact on eNB scheduling for the UE.

Mis-alignment may also be caused by PDCCH false alarms. In this case, although the eNB does not transmit any PDCCH to the UE at subframe n, the UE may erroneously declare a valid PDCCH and send an UL transmission on subframe n+4. A DL transmission from the eNB to the UE, if scheduled, will be missed by the UE.

Mis-alignment may also be caused by RRC re-configuration. For instance, a UE may be re-configured to use a different CQI reporting periodicity. There may be an ambiguity duration during RRC re-configuration, and as a result, the eNB and the UE may not be aligned with which subframes are for DL and UL, depending on the parameters involved in the RRC re-configuration.

The impact of misalignment may depend on the particular implementation. The eNB may take necessary arrangements to minimize the impact.

Figure 8:
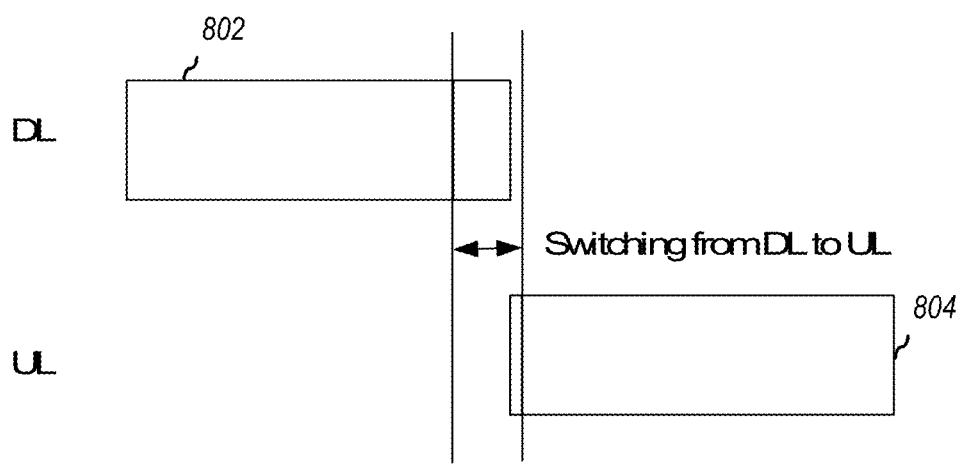
FIG. 8 illustrates an example UE switching between downlink and uplink transmission, according to certain aspects of the present disclosure.

Depending on the switching capability at the UE, the UE may lose a fraction of a subframe for DL reception and/or UL transmission when it transitions from Rx to Tx (vice versa). This is illustrated in FIG. 8 (DL transmission 802, UL transmission 804). As a result, the eNB needs to account for and/or to minimize the loss when scheduling PDSCH/PUSCH transmission in these subframes. However, since different UE capabilities may exist, it is difficult for eNB to ensure consistent UE behaviors within the cell.

Half-Duplex Operation for Low Cost Wireless Devices

Certain aspects of the present disclosure address the various issues above. Misalignment issues may be addressed by explicit configuration of downlink and uplink subframes for a UE. Switching issues may be addressed by techniques to facilitate switching by the inclusion of guard periods between subframes used for different types of transmissions.

In order to better manage resources (and avoid misalignment), an FDD eNB may explicitly signal the half-duplex UEs which sets of subframes are available for DL transmissions and which sets of subframes are available for UL transmissions (generally referred to herein as "constrained configurations"). Improved battery power savings may also be realized by the UE avoiding UL transmissions when not scheduled and avoiding listening for DL transmissions when none are scheduled.

Figures 9, 10:
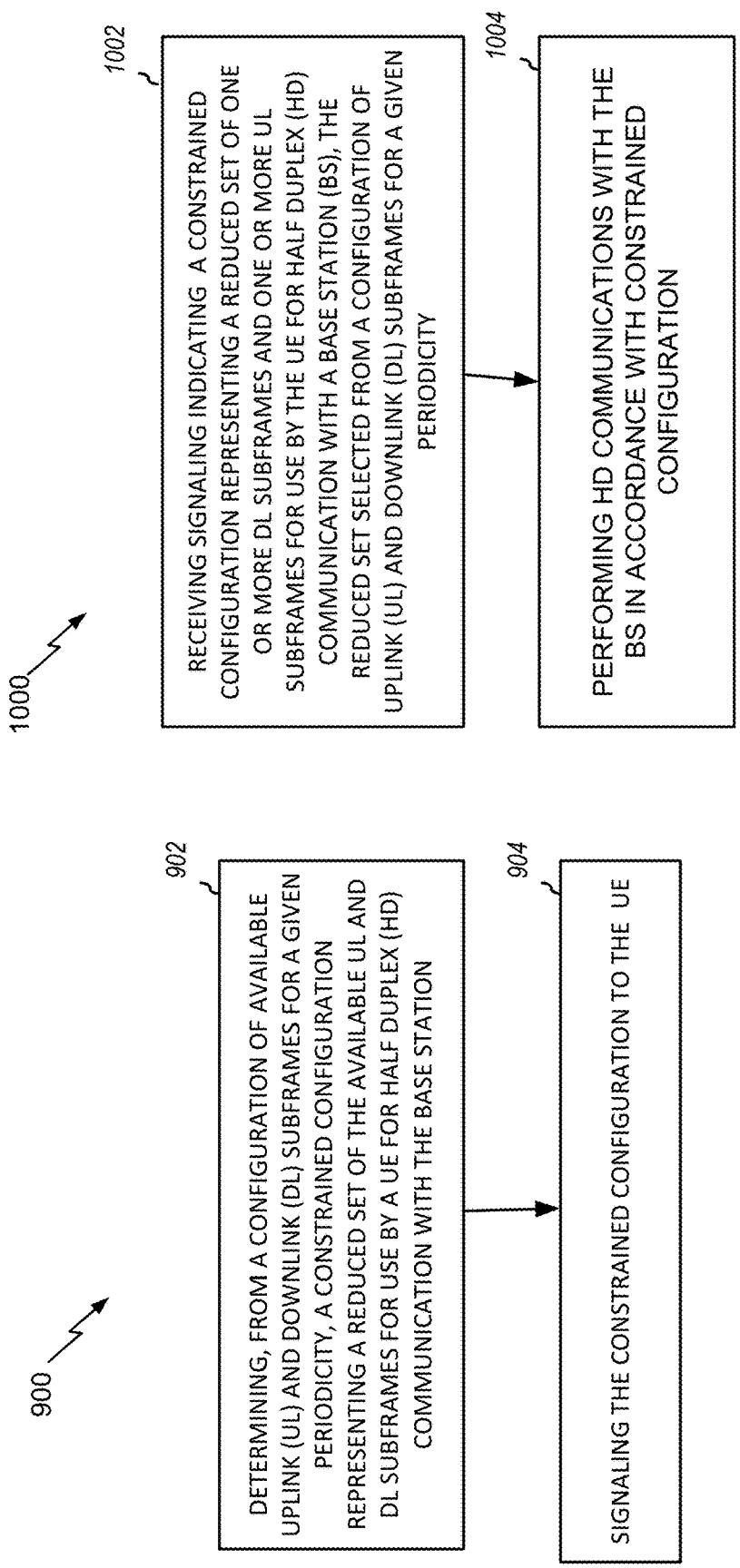
FIGS. 9 and 10 illustrate example operations for enabling half-duplex (HD) operations, in accordance with certain aspects of the present disclosure.

FIG. 9 illustrates example operations 900 a base station (such as an eNB) may perform to assist in HD operations by a UE. The operations begin, at 902, with the eNB determining, from a configuration of available uplink (UL) and downlink (DL) subframes for a given periodicity, a constrained configuration representing a reduced set of the available UL and DL subframes for use by a UE for half duplex (HD) communication with a base station. At 904, the eNB signals the constrained configuration to the UE.

FIG. 10 illustrates complementary operations 1000 that may be performed by the UE. As illustrated, at 1002, the UE may receive signaling indicating a constrained configuration representing a reduced set of one or more DL subframes and one or more UL subframes for use by the UE for half duplex (HD) communication with a base station, the reduced set selected from a configuration of uplink (UL) and downlink (DL) subframes for a given periodicity. The UE may then perform HD communications with the eNB based on the constrained configuration, at 1004.

The sets of subframes (specified by a constrained configuration) for a UE may be subject to various scheduling parameters. In some cases, UE-specific configurations may be used, wherein different UEs are signaled different sets of subframes for UL and DL transmissions. In some cases, an eNB may attempt to perform load balancing across subframes via UE-specific configuration (e.g., signal UE-specific subframes configuration based on UE loading). In some cases, there may be an anchor downlink/uplink subframes per cell (cell-specific) as part of a broadcast.

In some cases, various bits in a physical broadcast control channel (PBCH), such as bits in PBCH (e.g., PHICH bits) may be used to indicate (convey) there are at least some DL subframes and UL subframes reserved for DL reception and UL transmissions for half-duplex UEs in the cell.

In general, constrained configurations may vary depending on different goals and, in some cases, a constrained configuration defines DL and UL transmission in pairs. For example, in some cases, an effort may be made to avoid overlapped subframes between the two sets since the UE is half-duplex.

On the other hand, overlapped subframes between multiple sets may be allowed, and these overlapped subframes may be used for downlink or uplink depending on either via one or more predetermined rules or dynamic rules (e.g., similar to the current Rel-8 half-duplex UE operation-based on expected transmissions). In some cases, a constrained configuration indicates at least partially overlapping sets of subframes available for DL transmissions and subframes available for UL transmissions and whether or not overlapped subframes are available for downlink or uplink is determined based on one or more rules.

In some cases, an effort may be made for the (constrained) configuration to be compliant to H-ARQ timing. In this case, a configuration may be similar to the subframe configuration for a LTE Rel-10 relay node, where if subframe n is configured for DL, subframe n+k is configured for UL, observing the k-ms delay between PDSCH and ACK/NAK (acknowledging or negatively acknowledging the PDSCH transmission), and between PDCCH/PHICH and PUSCH. Depending on a particular embodiment, k may not necessarily be 4. For low cost UEs, it may be desirable to relax the H-ARQ processing time, for example, if only a small number of H-ARQ processes are supported (e.g., only one or two H-ARQ processes).

Similarly, for a different configuration (e.g., for a different cell or different UE) if subframe m is configured for UL, m+1 is configured for DL, observing the timing between PUSCH and PDCCH/PHICH (or some other message dependent timing constraint).

Unlike FDD relay nodes which can still transmit on the UL and receive on the DL simultaneously in the backhaul (i.e., which cannot receive DL in the backhaul and transmit DL in the access link simultaneously, or transmit UL in the backhaul and receive UL in the access link simultaneously), a half-duplex UE cannot receive DL and transmit UL simultaneously. As a result, n+k may not be available for UL for n is configured for DL, depending on the configuration.

In some cases, a configuration may also consider other factors, such as paging occasions, subframes for measurements, PBCH, synchronization, and the like. For instance, configure the set {0, 4, 5, 9} subframes or a subset of it to DL. It may be noted that monitoring of these subframes for a UE may not need to be continuous. The system information in the broadcast (system information) is not expected to change dynamically. Low cost UEs may tolerate a certain delay in paging response. As a result, a UE can monitor these subframes for broadcast on a sporadic or sparse manner. Note that, however, these subframes can be used for DL unicast. If these subframes are not used for DL, these subframes may be used for UL traffic.

In some cases, constrained configurations may also consider traffic needs and complexity. Without strong justification, symmetric DL and UL configurations may be supported for unicast traffic. That is, the configuration for DL and UL for one UE (or in one cell) may always be as a pair of frames offset by a certain amount, for example offset by k{n, n+k}. A configuration for another pair may be offset by a different amount, for example, offset by 1 subframes {m, m+1}. In some cases, n+k=m for at least for some subframes.

However, for broadcast traffic (e.g., SIB, paging, etc.), there may be standalone DL subframes. If UL heavy traffic is the focus, asymmetric configurations may also be considered. This may be allowed in some cases, only if there is strong justification.

The configuration periodicity may also consider various factors, such as the need of H-ARQ RTT, the number of H-ARQ processes, and the particular frame structure. As an example, a 40 ms periodicity (similar to HetNet subframe configuration) can be chosen considering 8 ms based H-ARQ RTT in UL and a 10 ms based frame structure. As another example, a 64 ms periodicity considering 8 H-ARQ processes and a 8 ms HARQ RTT in LTE Rel-10. If only one H-ARQ process is necessary for low cost UEs, and relaxed processing delay is desirable, one may have k=1=32 ms (32 ms delay).

The configuration and/or H-ARQ round-trip time RTT may also consider neighbor cell search if different subframe offsets are used among cells and attempt to comply with HARQ timing restrictions. For example, if 10 ms based periodicity is used, the UE may never have a chance to detect PBCH/PSS/SSS of neighboring cells. As a result, a different periodicity may be considered to ensure that there are at least some chances for the UE to detect neighboring cells, e.g., a 16 ms periodicity.

When new low-cost UEs and regular (e.g., non HD) UEs co-exist and if they have different H-ARQ timing, various considerations may be taken. For example, ACK/NAK resource on PUCCH (in response to DL transmissions) may need to be carefully designed to avoid collisions. For instance, the ACK/NAK resources for low-cost UEs can be layer 3 configured, or still linked with the starting CCE of the PDCCH but possibly with an additional offset, or always place ACK/NAK on PUSCH (e.g., no ACK/NAK on PUCCH). ACK/NAK resource on PHICH (in response to UL transmissions) may also needs to be carefully designed to avoid collisions.

Figures 11, 12:
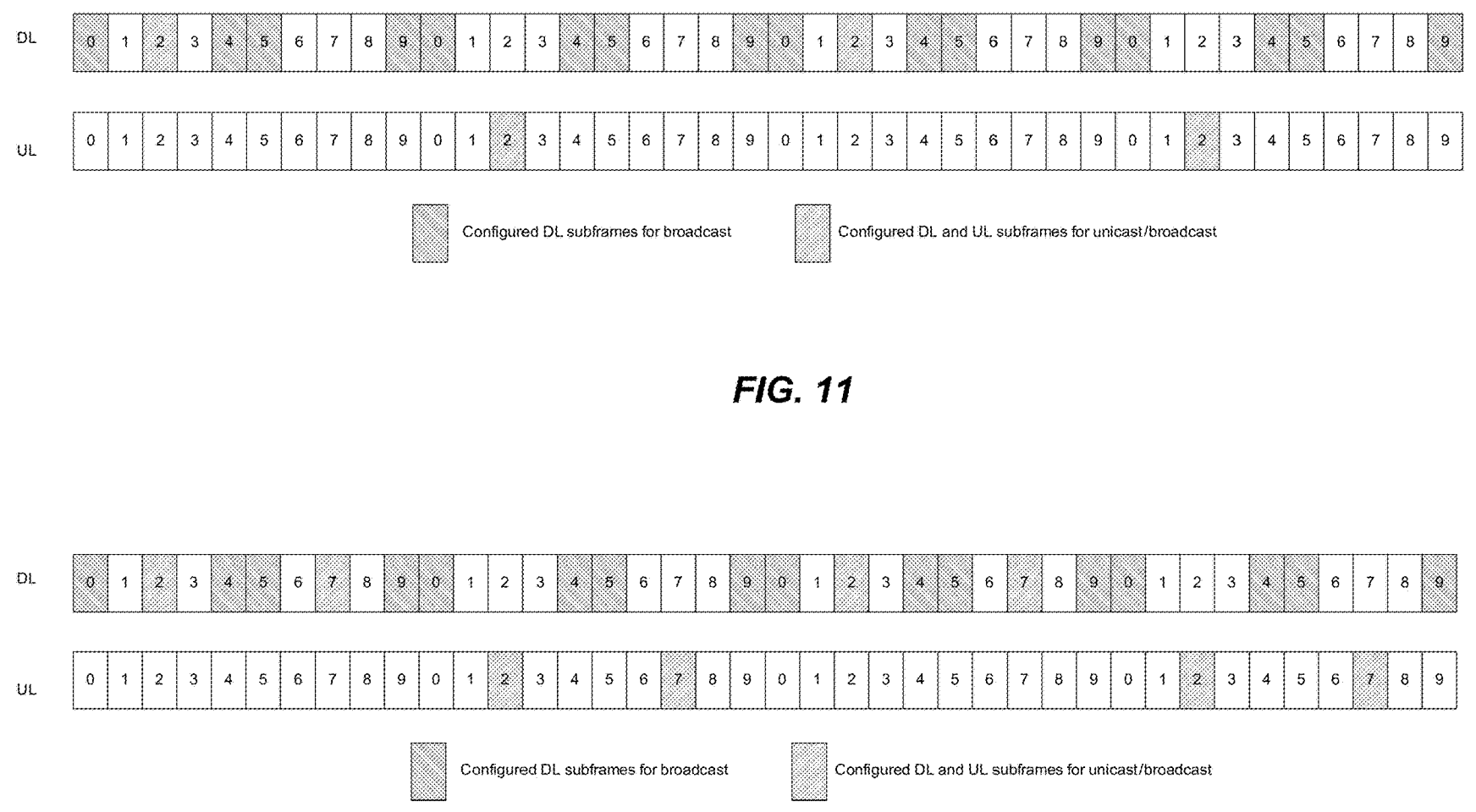

An example configuration is shown in FIGS. 11 and 12, in which a 40 ms periodicity is illustrated. In the illustrated example, subframes 0, 4, 5, 9 are configured to the UE for DL broadcast. In FIG. 11, subframe 2 is configured to the UE for unicast and/or broadcast, alternating between DL and UL subframes, which results in a 20 ms H-ARQ RTT. In FIG. 12, subframes 2 and/or 7 are configured to the UE for unicast and/or broadcast (DL subframes only), alternating between DL and UL subframes, which again results in a 20 ms H-ARQ RTT.

As indicated earlier, if a subframe shift exists among different eNBs, 20 ms periodicity may prevent UEs from detecting neighboring cells. Therefore, a different periodicity may be considered. For example, when the UE is configured with the subframes for DL and UL, if the UE layer 3 configured periodic UL signal transmissions (such as CQI, SR, SRS, etc.), the UE may only transmit these signals in UL subframes and should refrain from UL transmissions if the transmission instances of the periodic signals are not UL subframes.

The eNB may also try to align the periodic UL signal transmissions with the UL subframe configuration for the UE as much as possible (e.g., as the UE will be expecting to transmit anyway).

For H-ARQ timing, it may be unduly restrictive if only the combination of {n, n+k} DL/UL subframes is allowed. Therefore, in the case that a DL subframe n does not have the corresponding subframe n+4 in UL, there may be various alternatives. For example, a first available UL subframe at or after 4 ms, a fixed tabulated H-ARQ timing, or a cross-subframe scheduling may be used.

UL sequential H-ARQ process indexing as for the relay node may also apply. For example, within any 8 ms, the max # of UL subframes may be counted, which gives the max # of UL H-ARQ processes. H-ARQ process may be assigned sequentially based on the available UL subframes. Similarly, a UL subframe m may not have a corresponding DL subframe at m+4. This design can be similarly handled.

Facilitating Switching for UE

In some cases, in order to facilitate switching for a UE, between subframes for different (UL and DL) types, guard periods may be introduced. There may be different alternatives for guard period designs.

For example, a subframe-level guard period may be used, with guard periods having a granularity of subframes. For example, the configured DL and UL subframes in this cases do not have to span the entire set of subframes, such that some leftover subframes can serve for guard periods.

As illustrated in FIGS. 11 and 12 above, there is at least one subframe between a configured DL subframe and the closest configured UL subframe, which may facilitate switching. An advantage to this approach is that it is relatively simple. However, subframe granularity may impose restrictions on the possible DL/UL configurations for a UE, and further impact load balancing over different subframes.

Another approach is a smaller granularity for a guard period, for example, symbol-level granularity. In this case, a guard period can have a granularity of symbols, for example, similar to the design of special subframes for TDD.

Figure 13:
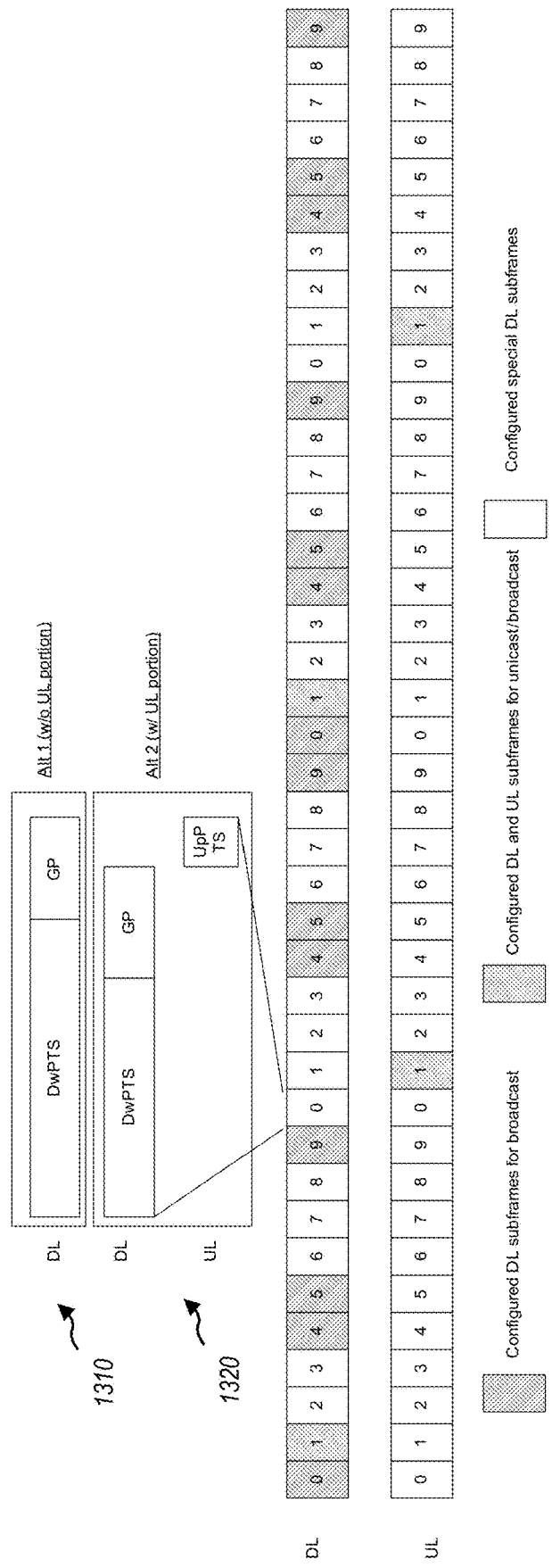
FIG. 13 illustrates an example FDD subframe configurations with a special subframe, according to certain aspects of the present disclosure.

For example, a downlink subframe may have a DL portion (similar to DwPTS), followed by a guard period, as illustrated in FIG. 13. PDSCH may only be mapped to the DwPTS portion. This may help when subframes of different transmission types (DL and UL) are adjacent and, in some cases, a first occurring subframe of the different types of subframes may contain the guard period. In some cases, the guard period may be provided in a separate subframe that occurs between the subframes used for different types of transmissions. As illustrated at 1310, according to one option, the subframe may not have an UL portion.

If shortened PRACH format is desirable, the subframe may also have an UL portion (similar to UpPTS), this option is shown in FIG. 13 at 1320. Note that if only one symbol is configured for UpPTS, the UpPTS can also co-exist with other regular UL transmissions if shortened PUCCH/PUSCH is used. Finer granularity than symbol-level may not be necessary. In some cases, subframes may contain guard periods that are dependent, at least in part, on a particular cell ID.

FIG. 14 illustrates example operations 1400 a base station (such as an eNB) may perform to provide guard periods between different types of transmissions. The operations begin, at 1402, with the eNB signaling a configuration of one or more subframes available for downlink (DL) transmissions to the UE and one or more subframes available for uplink (UL) transmissions from the UE. At 1404, the eNB provides guard periods between portions of subframes used for different types of transmissions.

FIG. 15 illustrates complementary operations 1500 that may be performed by the UE. As illustrated, at 1502, the UE may receive signaling indicating a configuration of one or more subframes available for uplink (UL) transmissions to a base station (BS) and one or more subframes available for downlink (DL) transmissions from the BS. At 1504, the UE determines the location of guard periods between portions of subframes used for different types of transmissions.

Depending on a particular embodiment and/or configuration, DL subframes with guard periods may be explicitly or implicitly signaled. For example, explicit signaling may provide a specific set of subframes with guard periods.

Implicit signaling may be tied with the DL/UL subframe configuration. For example, if a configured DL subframe is immediately followed by a configured UL subframe, the subframe may be a special subframe for the UE. Thus, a UE may be able to identify such subframes without explicit signaling. For example, referring to FIG. 17, since subframe 0 is immediately followed by a UL subframe (subframe 1), a UE may readily identify subframe 0 as a special subframe.

Similar to TDD frame configurations, multiple configurations of guard periods may also be supported and signaled to the UE. Different from TDD frame configurations, however, the configuration may be UE-specific, for example, to accommodate different UE switching capabilities. In addition, depending on the distance between the UE and the serving cell, different UEs may have different timing advances.

These special DL subframes may be UE-specific. A minimum set of cell-specific special DL subframes is also possible, similar to the configuration of DL and UL subframes. For better link adaptation, the RB index for transport block size lookup can be adjusted by a factor, similar to TDD DwPTS.

DM-RS design in these case may reuse relay node design, or the Rel-10 UE DM-RS design in DwPTS (if only up to two control symbols are configured for the subframe, e.g., only limiting the special subframes in MBSFN subframes), or a new design (e.g., shifted DM-RS design).

The same design philosophies discussed above may also be applicable to low-cost half-duplex UEs operated in a TDD system. In the TDD system, although subframes are explicitly partitioned to downlink subframes, special subframes, and uplink subframes, for battery power savings and reduced PDCCH false alarm probability, the UE may still be explicitly indicated a limited subset of downlink/special/uplink subframes to monitor. Since TDD already has special subframes, the explicit special subframe containing guard periods, discussed above, may not be necessary.

Aspects of the present disclosure provide techniques that may help enable half-duplex operation for low cost UEs. The techniques may involve explicit configuration of downlink and uplink subframes for a UE, where the DL and UL subframes may preferably be non-overlapping. For FDD systems, DL subframes may come from the DL frequency, UL subframe may come from the UL frequency in a FDD carrier.

In some cases, H-ARQ RTT may be relaxed. For example, instead of determining the number of H-ARQ processes based on the configured subframes and a fixed H-ARQ RTT, the H-ARQ RTT may be determined by a fixed number of H-ARQ processes (as small as one) and the configured subframes.

Certain aspects may facilitate switching for a UE by utilizing subframes with guard periods. The subframes may be explicitly signaled or implicitly determined (e.g., DL subframes followed immediately by UL subframes).

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in combinations thereof. A software/firmware module may reside in RAM memory, flash memory, ROM memory, EPROM memory, EEPROM memory, PCM (phase change memory), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for enabling half-duplex (HD) operations for at least one user equipment (UE), comprising:
   signaling a configuration of one or more subframes available for different types of transmissions, wherein the different types of transmissions comprise one or more subframes available for downlink (DL) transmissions to a UE and one or more subframes available for uplink (UL) transmissions from the UE, and wherein a periodicity of the configuration is based at least in part, on one or more of a hybrid automatic repeat request (HARQ) round trip time (RTT), a number of HARQ processes, or a frame structure associated with the one or more subframes; and
   providing guard periods between portions of subframes used for the different types of transmissions, wherein:
   the subframes used for the different types of transmissions comprise adjacent subframes;
   a first occurring subframe of the subframes used for the different types of transmissions contains a guard period; and
   the one or more subframes available for DL transmissions and the one or more subframes available for UL transmissions are defined in pairs, wherein the one or more subframes available for DL transmissions are associated with a first frequency and the one or more subframes available for UL transmissions are associated with a second frequency, and wherein for a given subframe, the UE is configured to receive DL transmissions or transmit UL transmissions and not available to simultaneously receive DL transmissions and transmit UL transmissions.

2. The method of claim 1, wherein the providing comprises providing the guard period between at least a portion of a subframe used for DL transmissions and a portion of a subframe used for UL transmissions.

3. The method of claim 1, further comprising:
   providing an explicit indication of which subframes contain guard periods.

4. The method of claim 1, wherein subframes available for a first type of transmission that are immediately followed by a subframe available for a different type of transmission contain guard periods.

5. The method of claim 1, wherein the periodicity is further based, at least in part, on considerations related to neighbor cell search if different subframe offsets are used among cells.

6. The method of claim 1, further comprising transmitting one or more anchor subframes in a broadcast transmission, wherein the one or more anchor subframes include one or more bits indicating that at least some DL subframes and UL subframes of a frame are reserved for DL reception and UL transmissions for half-duplex UEs.

7. The method of claim 6, wherein the one or more bits comprise one or more reused Physical Hybrid Automatic Repeat Request Indicator Channel (PHICH) of a physical broadcast channel (PBCH).

8. The method of claim 1, further comprising transmitting configuration information for one or more acknowledgement/non-acknowledgement (ACK/NACK) resources corresponding to the one or more subframes available for DL transmissions and the one or more subframes available for UL transmissions.

9. The method of claim 8, wherein the one or more ACK/NACK resources are based on an offset to a starting control channel element (CCE) of a physical downlink control channel (PDCCH).

10. The method of claim 9, wherein the one or more ACK/NACK resources comprises one or more resources on a physical uplink shared channel (PUSCH).

11. The method of claim 1, wherein the configuration for the one or more subframes is specific to UEs that do not include a duplexer.

12. A method for enabling half-duplex (HD) operations by a user equipment (UE), comprising:
   receiving signaling indicating a configuration of one or more subframes available for different types of transmissions, wherein the different types of transmissions comprise one or more subframes available for uplink (UL) transmissions to a base station (BS) and one or more subframes available for downlink (DL) transmissions from the BS, and wherein a periodicity of the configuration is based at least in part, on one or more of a hybrid automatic repeat request (HARQ) round trip time (RTT), a number of HARQ processes, or a frame structure associated with the one or more subframes; and determining location of guard periods between portions of subframes used for the different types of transmissions, wherein:
the subframes used for the different types of transmissions comprise adjacent subframes;
a first occurring subframe of the subframes used for the different types of transmissions contains a guard period; and
the one or more subframes available for DL transmissions and the one or more subframes available for UL transmissions are defined in pairs, wherein the one or more subframes available for DL transmissions are associated with a first frequency and the one or more subframes available for UL transmissions are associated with a second frequency, and wherein for a given subframe, the UE is configured to receive DL transmissions or transmit UL transmissions and not available to simultaneously receive DL transmissions and transmit UL transmissions.

13. The method of claim 12, wherein the guard period is located between at least a portion of a subframe used for DL transmissions and a portion of a subframe used for UL transmissions.

14. The method of claim 12, further comprising:
receiving an explicit indication of which subframes contain guard periods.

15. The method of claim 12, wherein subframes available for a first type of transmission that are immediately followed by a subframe available for a different type of transmission contain guard periods.

16. An apparatus for enabling half-duplex (HD) operations for at least one user equipment (UE), comprising:
means for signaling a configuration of one or more subframes available for different types of transmissions, wherein the different types of transmissions comprise one or more subframes available for downlink (DL) transmissions to a UE and one or more subframes available for uplink (UL) transmissions from the UE, and wherein a periodicity of the configuration is based at least in part, on one or more of a hybrid automatic repeat request (HARQ) round trip time (RTT), a number of HARQ processes, or a frame structure associated with the one or more subframes;
means for providing guard periods between portions of subframes used for the different types of transmissions, wherein:
the subframes used for the different types of transmissions comprise adjacent subframes;
a first occurring subframe of the subframes used for the different types of transmissions contains a guard period; and
the one or more subframes available for DL transmissions and the one or more subframes available for UL transmissions are defined in pairs, wherein the one or more subframes available for DL transmissions are associated with a first frequency and the one or more subframes available for UL transmissions are associated with a second frequency, and wherein for a given subframe, the UE is configured to receive DL transmissions or transmit UL transmissions and not available to simultaneously receive DL transmissions and transmit UL transmissions.

17. The apparatus of claim 16, wherein the means for providing comprises means for providing the guard period between at least a portion of a subframe used for DL transmissions and a portion of a subframe used for UL transmissions.

18. The apparatus of claim 16, further comprising:
means for providing an explicit indication of which subframes contain guard periods.

19. The apparatus of claim 16, wherein subframes available for a first type of transmission that are immediately followed by a subframe available for a different type of transmission contain guard periods.

20. An apparatus for enabling half-duplex (HD) operations by a user equipment (UE), comprising:
means for receiving signaling indicating a configuration of one or more subframes available for different types of transmissions, wherein the different types of transmission comprise one or more subframes available for uplink (UL) transmissions to a base station (BS) and one or more subframes available for downlink (DL) transmissions from the BS, and wherein a periodicity of the configuration is based at least in part, on one or more of a hybrid automatic repeat request (HARQ) round trip time (RTT), a number of HARQ processes, or a frame structure associated with the one or more subframes; and
means for determining location of guard periods between portions of subframes used for the different types of transmissions, wherein:
the subframes used for the different types of transmissions comprise adjacent subframes;
a first occurring subframe of the subframes used for the different types of transmissions contains a guard period; and
the one or more subframes available for DL transmissions and the one or more subframes available for UL transmissions are defined in pairs, wherein the one or more subframes available for DL transmissions are associated with a first frequency and the one or more subframes available for UL transmissions are associated with a second frequency, and wherein for a given subframe, the UE is configured to receive DL transmissions or transmit UL transmissions and not available to simultaneously receive DL transmissions and transmit UL transmissions.

21. The apparatus of claim 20, wherein the guard period is located between at least a portion of a subframe used for DL transmissions and a portion of a subframe used for UL transmissions.

22. The apparatus of claim 20, further comprising:
means for receiving an explicit indication of which subframes contain guard periods.

23. The apparatus of claim 20, wherein subframes available for a first type of transmission that are immediately followed by a subframe available for a different type of transmission contain guard periods.

24. An apparatus for enabling half-duplex (HD) operations for at least one user equipment (UE), comprising:
at least one processor configured to:
signal a configuration of one or more subframes available for different types of transmissions, wherein the different types of transmission comprise one or more subframes available for downlink (DL) transmissions to a UE and one or more subframes available for uplink (UL) transmissions from the UE, and wherein a periodicity of the configuration is based at least in part, on one or more of a hybrid automatic repeat request (HARQ) round trip time (RTT), a number of HARQ processes, or a frame structure associated with the one or more subframes; and provide guard periods between portions of subframes used for the different types of transmissions, wherein:
the subframes used for the different types of transmissions comprise adjacent subframes;
a first occurring subframe of the subframes used for the different types of transmissions contains a guard period;
the one or more subframes available for DL transmissions and the one or more subframes available for UL transmissions are defined in pairs;
the one or more subframes available for DL transmissions are associated with a first frequency and the one or more subframes available for UL transmissions are associated with a second frequency; and
for a given subframe, the UE is configured to receive DL transmissions or transmit UL transmissions and not available to simultaneously receive DL transmissions and transmit UL transmissions; and
a memory coupled with the at least one processor.

25. An apparatus for enabling half-duplex (HD) operations by a user equipment (UE), comprising:
at least one processor configured to:
receive signaling indicating a configuration of one or more subframes available for different types of transmissions, wherein the different types of transmission comprise one or more subframes available for uplink (UL) transmissions to a base station (BS) and one or more subframes available for downlink (DL) transmissions from the BS, and wherein a periodicity of the configuration is based at least in part, on one or more of a hybrid automatic repeat request (HARQ) round trip time (RTT), a number of HARQ processes, or a frame structure associated with the one or more subframes; and
determine location of guard periods between portions of subframes used for the different types of transmissions, wherein:
the subframes used for the different types of transmissions comprise adjacent subframes;
a first occurring subframe of the subframes used for the different types of transmissions contains a guard period;
the one or more subframes available for DL transmissions and the one or more subframes available for UL transmissions are defined in pairs;
the one or more subframes available for DL transmissions are associated with a first frequency and the one or more subframes available for UL transmissions are associated with a second frequency; and
for a given subframe, the UE is configured to receive DL transmissions or transmit UL transmissions and not available to simultaneously receive DL transmissions and transmit UL transmissions; and
a memory coupled with the at least one processor.

26. A computer program product for enabling half-duplex (HD) operations for at least one user equipment (UE), comprising a non-transitory computer readable medium having instructions stored thereon, the instructions executable by one or more processors for:
signaling a configuration of one or more subframes available for different types of transmissions, wherein the different types of transmission comprise one or more subframes available for downlink (DL) transmissions to a UE and one or more subframes available for uplink (UL) transmissions from the UE, and wherein a periodicity of the configuration is based at least in part, on one or more of a hybrid automatic repeat request (HARQ) round trip time (RTT), a number of HARQ processes, or a frame structure associated with the one or more subframes; and
providing guard periods between portions of subframes used for the different types of transmissions, wherein:
the subframes used for the different types of transmissions comprise adjacent subframes;
a first occurring subframe of the subframes used for the different types of transmissions contains a guard period; and
the one or more subframes available for DL transmissions and the one or more subframes available for UL transmissions are defined in pairs, wherein the one or more subframes available for DL transmissions are associated with a first frequency and the one or more subframes available for UL transmissions are associated with a second frequency, and wherein for a given subframe, the UE is configured to receive DL transmissions or transmit UL transmissions and not available to simultaneously receive DL transmissions and transmit UL transmissions.

27. A computer program product for enabling half-duplex (HD) operations for at least one user equipment (UE), comprising a non-transitory computer readable medium having instructions stored thereon, the instructions executable by one or more processors for:
receiving signaling indicating a configuration of one or more subframes available for different types of transmissions, wherein the different types of transmission comprise one or more subframes available for uplink (UL) transmissions to a base station (BS) and one or more subframes available for downlink (DL) transmissions from the BS, and wherein a periodicity of the configuration is based at least in part, on one or more of a hybrid automatic repeat request (HARQ) round trip time (RTT), a number of HARQ processes, or a frame structure associated with the one or more subframes; and
determining location of guard periods between portions of subframes used for the different types of transmissions, wherein:
the subframes used for the different types of transmissions comprise adjacent subframes;
a first occurring subframe of the subframes used for the different types of transmissions contains a guard period; and
the one or more subframes available for DL transmissions and the one or more subframes available for UL transmissions are defined in pairs, wherein the one or more subframes available for DL transmissions are associated with a first frequency and the one or more subframes available for UL transmissions are associated with a second frequency, and wherein for a given subframe, the UE is configured to receive DL transmissions or transmit UL transmissions and not available to simultaneously receive DL transmissions and transmit UL transmissions.

* * * * *